(12) United States Patent
    Takeyama

(10) Patent No.: US 7,642,760 B2
(45) Date of Patent: Jan. 5, 2010

(54) POWER SUPPLY CIRCUIT

(75) Inventor: Yoshikazu Takeyama, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 231 days.

(21) Appl. No.: 11/757,605

(22) Filed: Jun. 4, 2007

(65) Prior Publication Data

US 2007/0279031 A1    Dec. 6, 2007

(30) Foreign Application Priority Data

Jun. 5, 2006    (JP) .............................. 2006-155820

(51) Int. Cl.
    *G05F 1/40* (2006.01)
    *G05F 1/56* (2006.01)
(52) U.S. Cl. ...................... 323/271; 323/282
(58) Field of Classification Search ................. 323/223,
    323/225, 268, 271, 282; 363/59, 60; 327/535–538,
    327/540, 541, 543
    See application file for complete search history.

(56) References Cited

U.S. PATENT DOCUMENTS 5,883,501 A * 3/1999 Arakawa ..................... 323/222
6,717,458 B1 * 4/2004 Potanin ....................... 327/536
6,927,620 B2 * 8/2005 Senda .......................... 327/536
7,138,786 B2 * 11/2006 Ishigaki et al. .............. 323/224
7,138,853 B2 * 11/2006 Kim et al. .................... 327/536

FOREIGN PATENT DOCUMENTS

JP    2004-157613    6/2004

* cited by examiner

*Primary Examiner*—Matthew V Nguyen
(74) *Attorney, Agent, or Firm*—Oblon, Spivak, McClelland, Maier & Neustadt, L.L.P.

(57) ABSTRACT

The disclosure concerns a power supply circuit comprising a voltage converter receiving an external voltage and outputting an internal voltage; a first switch and a second switch connected between an output of the voltage converter and a constant voltage source; a resistor provided between the first switch and the second switch, and dividing the internal voltage; a comparator including a first input unit, a second input, and an output which is connected to the voltage converter; a reference voltage source supplying a reference voltage to the first input; a feedback feeding back a voltage divided by the resistor to the second input from a node between the first switch and the second switch; a setting voltage source, to the second input; a third switch connected between the setting voltage source and the second input; and a control signal generator controlling the first switch, the second switch, and the third switch.

10 Claims, 6 Drawing Sheets

POWER SUPPLY CIRCUIT

CROSS-REFERENCE TO RELATED APPLICATION

This application is based upon and claims the benefit of priority from the prior Japanese Patent Applications No. 2006-155820, filed on Jun. 5, 2006, the entire contents of which are incorporated herein by reference.

BACKGROUND OF THE INVENTION

1. Field of the Invention

The invention relates to a power supply circuit.

2. Related Art

In semiconductor devices such as a system LSI, it has become difficult to commonly use a fixed power voltage for its entire system. For such a semiconductor device, a power supply circuit is required that converts a power voltage to output the power. Some of the power supply circuits have a standby function to reduce power consumption. The standby function is a function that cuts a DC current by inactivating the power supply circuit.

The power supply circuit having the standby function includes two voltage converting circuits that are connected in parallel to each other and a reference-voltage generating circuit (also referred to as BGR (Band Gap Reference) circuit). These two voltage converting circuits are connected between the BGR circuit and an output terminal.

The BGR circuit receives an external voltage and outputs a reference voltage. The two voltage converting circuits convert the external voltage into an internal power voltage by reducing or boosting the external voltage based on the reference voltage, and outputs this internal power voltage. The internal power voltage is output from the output terminal of the power supply circuit, and is used as a power voltage in a semiconductor device.

One of the two voltage converting circuits (first voltage converting circuit) is active at all times, and the other one of the two voltage converting circuits (second voltage converting circuit) is controlled to be active or inactive by a control signal. When the second voltage converting circuit is active, the internal power voltage is a voltage that is determined by the first and the second voltage converting circuits. On the other hand, when the second voltage converting circuit is inactive, the internal power voltage is a voltage that is determined by the first voltage converting circuit active at all times.

In a conventional power supply circuit, when the second voltage converting circuit transits from an inactive state to an active state, the internal power voltage is deviated from a desirable voltage, and it takes time to recover a steady state. That is, a transition response time is long when the second voltage converting circuit transits from the inactive state to the active state. This is because RC delay is caused due to a parasitic capacitance and a resistor of wirings arranged in the power supply circuit.

SUMMARY OF THE INVENTION

A power supply circuit according to an embodiment of the present invention comprises a voltage converter receiving an external voltage from an external voltage source and outputting an internal voltage which is different from the external voltage; a first switching element and a second switching element connected between an output of the voltage converter and a constant voltage source; a resistor provided between the first switching element and the second switching element, and dividing the internal voltage; a comparator including a first input unit, a second input unit, and an output unit which is connected to the voltage converter; a reference voltage source supplying a reference voltage to the first input unit; a feedback unit feeding back a voltage divided by the resistor to the second input unit from a node between the first switching element and the second switching element; a setting voltage source supplying a voltage which is arbitrarily set, to the second input unit; a third switching element connected between the setting voltage source and the second input unit; and a control signal generator controlling the first switching element, the second switching element, and the third switching element.

A method of driving a power supply circuit according to an embodiment of the present invention, the power supply circuit comprising a voltage converter receiving an external voltage from an external voltage source and outputting an internal voltage that is different from the external voltage, a first switching element and a second switching element which are connected between an output of the voltage converter and a constant voltage source, a resistor provided between the first switching element and the second switching element, a comparator including a first input unit, a second input unit, and an output unit which is connected to the voltage converter, a reference voltage source connected to the first input unit, a feedback unit feeding back a voltage divided by the resistor to the second input unit from a node which is present between the first switching element and the second switching element, a setting voltage source connected to the second input unit, and a third switching element connected between the setting voltage source and the second input unit, the method comprises turning the first switching element and the second switching element into an ON state, and the third switching element into an OFF state, when the voltage converter is performing a boosting operation; and turning the first switching element and the second switching element into the OFF state, and the third switching element into the ON state, when the voltage converter is not performing the boosting operation.

DETAILED DESCRIPTION OF THE INVENTION

Embodiments of the present invention will be explained below with reference to the accompanying drawings. Note that the present invention is not limited to the embodiments.

In the embodiments, even if a PMIS (P-type metal-insulator transistor) transistor and an NMIS (N-type metal-insulator transistor) transistor are changed to each other, the same effects can be obtained. In this case, it is necessary to change HIGH and LOW of the control signal also.

Figure 1:
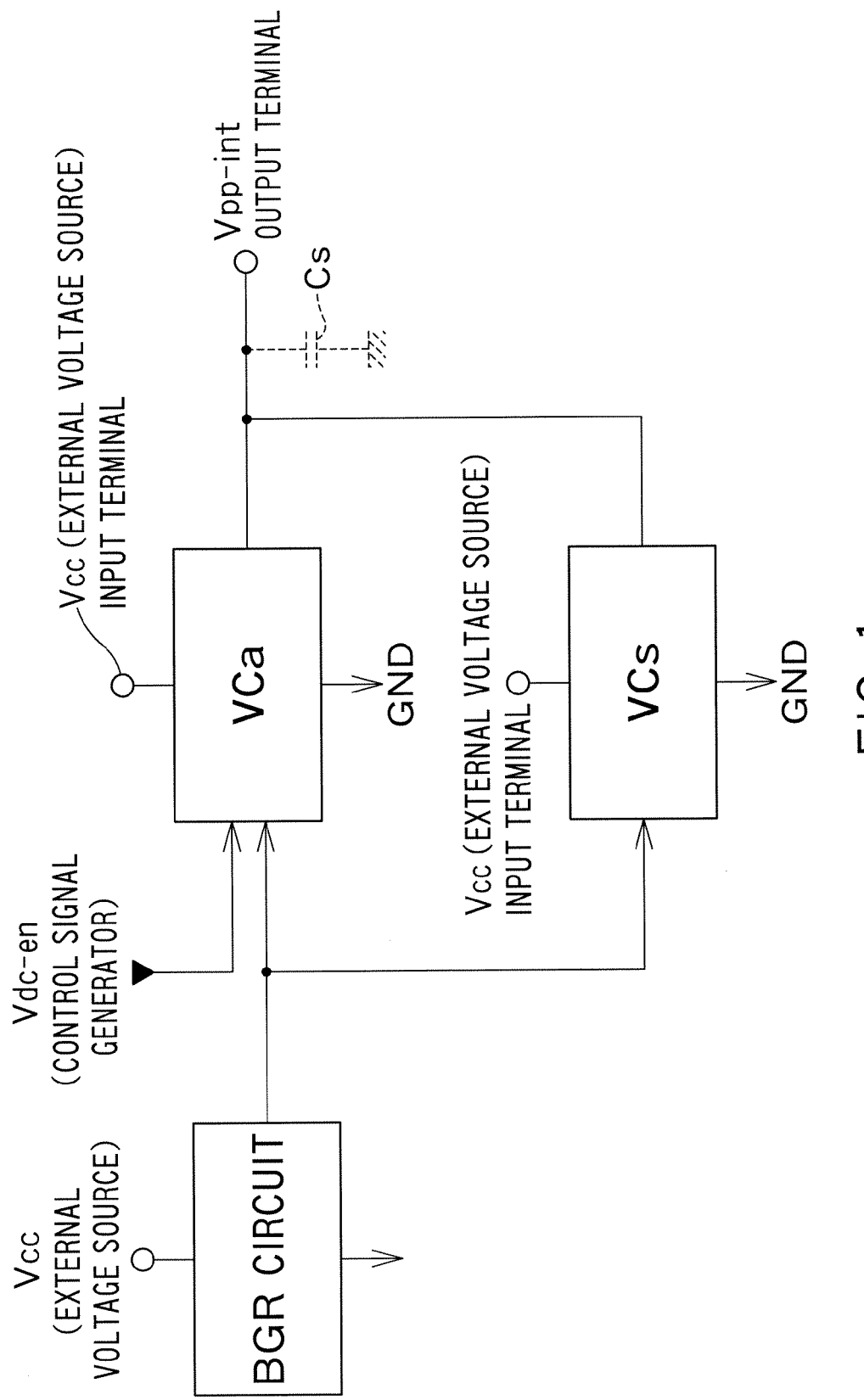
FIG. 1 is a block diagram of a power boosting circuit having a standby function.

FIG. 1 is a block diagram of a power boosting circuit having a standby function according to a first embodiment of the present invention. A BGR circuit receives a voltage Vcc of an external voltage source, and outputs a reference voltage Vref. The external voltage Vcc is, for example, 5 V.

A first voltage converting circuit VCs and a second voltage converting circuit VCa are connected in parallel to each other, and are connected between the BGR circuit and an output terminal. To the voltage converting circuit VCs and the voltage converting circuit VCa, the reference voltage Vref and the external voltage Vcc are input. The voltage converting circuit VCs and the voltage converting circuit VCa output an internal power voltage Vpp-int that is obtained by boosting the external voltage Vcc based on the reference voltage Vref. The internal power voltage Vpp-int is output from the output terminal of the power supply circuit and is used as a power voltage in a semiconductor device.

The voltage converting circuit VCs is in an active state at all times, and the voltage converting circuit VCa is controlled to be the active state or an inactive state by a control signal Vdc-en. When the voltage converting circuit VCa is in the active state, the internal power voltage Vpp-int is a voltage that is determined by the voltage converting circuit VCs and the voltage converting circuit VCa. On the other hand, when the voltage converting circuit VCa is in the inactive state, the internal power voltage Vpp-int is a voltage that is determined by the voltage converting circuit VCs, which is active at all times.

Figure 2:
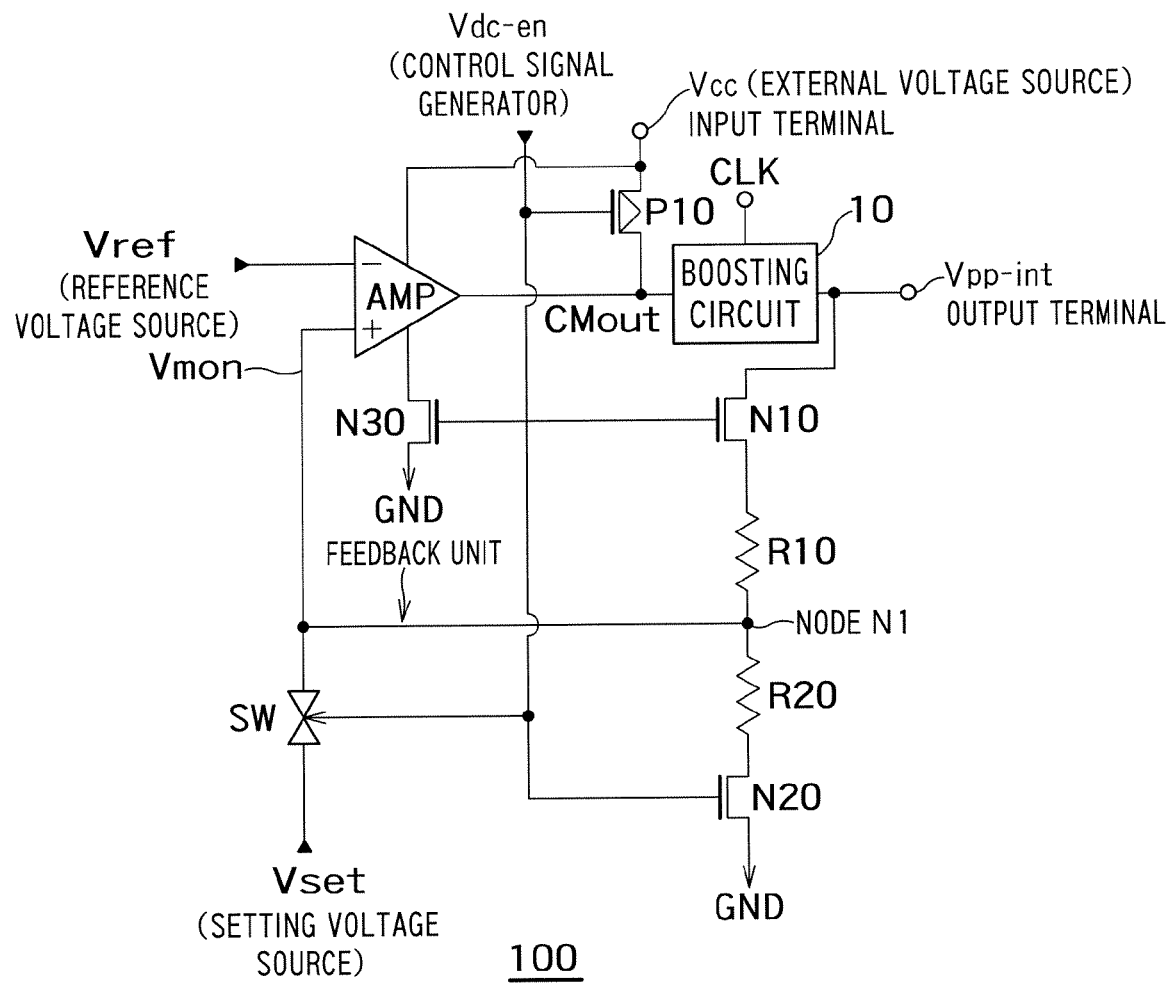
FIG. 2 is a circuit diagram of the voltage converting circuit VCa according to a first embodiment of the present invention.

FIG. 2 is a circuit diagram of the voltage converting circuit VCa according to the embodiment of the present invention. The voltage converting circuit VCa according to the embodiment is hereinafter referred to as a VC circuit 100. The VC circuit 100 includes a boosting circuit 10, a PMIS transistor P10, NMIS transistors N10 to N30, a resistor R10, a resistor R20, a comparator AMP, and a switch SW.

The boosting circuit 10 is connected between an output terminal and an input terminal of the VC circuit 100, and receives the external voltage Vcc from an external voltage source and outputs the internal voltage Vpp-int. The transistors N10 and N20 are connected between the output terminal and a ground GND serving as a constant voltage source. Between the transistors N10 and N20, the resistors R1 and R2 are connected. The resistors R1 and R2 are connected through a node N1. The transistor N10, the resistors R10, R20, and the transistor N20 are connected in series between the output terminal and the ground GND.

The comparator AMP has two input units and an output unit. The output unit is connected to the boosting circuit 10. The comparator AMP receives the reference voltage Vref and a monitor voltage Vmon through a first input unit and a second input unit, respectively, and amplifies a difference between the reference voltage Vref and the monitor voltage Vmon to output. A voltage of an output CMout is the external voltage Vcc when the transistor P10 is ON, and is an output voltage from the comparator AMP when the transistor P10 is OFF. The reference voltage Vref is a constant voltage that is supplied from the BGR circuit based on the external voltage Vcc.

The resistors R10 and R20 divide the internal power voltage Vpp-int at the output terminal. The voltage Vmon at the node N1 obtained by dividing the internal power voltage Vpp-int is fed back from the node N1 to the second input unit of the comparator AMP. A wiring between the node N1 and the comparator AMP functions as a feedback unit FB.

The transistor N10 can control connection and disconnection between the node N1 and the output terminal. The transistor N20 can control connection and disconnection between the node N1 and the ground GND. Since the transistor N10 is connected to an output of the boosting circuit 10, it is preferable to be high breakdown-voltage compared to the transistors N20, N30, and P10. Moreover, the transistor N10 is preferable to be of low resistance, to accurately transfer the internal power voltage Vpp-int when the comparator AMP is in the active state. This indicates that a threshold voltage of the transistor N10 is preferable to be low. That is, it is preferable that the transistor N10 is high breakdown-voltage and has a low threshold voltage.

The switch SW is connected between the second input unit and a setting voltage source. Accordingly, the switch SW connects the second input unit to the setting voltage source, or disconnects the second input unit from the setting voltage source. The setting voltage source Vset is arbitrarily set.

The transistor P10 is connected between the boosting circuit 10 and the external voltage source. The transistor N30 is arranged on a route through which the power is supplied from the external voltage source to the comparator AMP. The transistor N30 is connected between the comparator AMP and a ground GND. The transistor N30 can cut power supply from the external voltage source to the comparator AMP.

A gate of each of the transistors P10, and N10 to N30 and the switch SW are connected to a control signal generator. The transistors N10 to N30 perform the same switching operation (in-phase), and the switch SW and the transistor P10 perform the switching operation opposite to that of the transistors N10 to N30 (reversed phase). Specifically, when the transistors N10 to N30 are in an ON state, the switch SW and the transistor P10 are in an OFF state. When the transistor N10 to N30 are in the OFF state, the switch SW and the transistor P10 are in the ON state.

Figure 3:
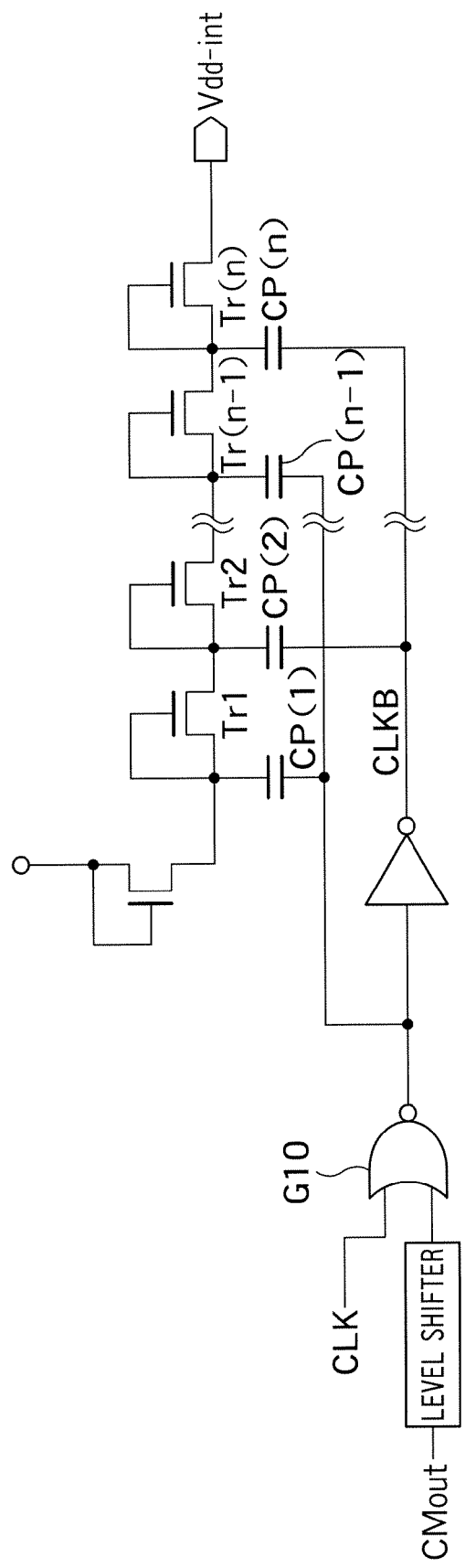
FIG. 3 is a circuit diagram showing an internal configuration of the boosting circuit 10.

FIG. 3 is a circuit diagram showing an internal configuration of the boosting circuit 10. The boosting circuit 10 receives the output CMout, and boosts this output CMout with a charge pump to output the internal power voltage Vpp-int. The boosting unit 10 boosts, for example, the output CMout of 5 V to the internal power voltage Vpp-int of 20 V. The boosting circuit 10 is activated in accordance with a clock signal CLK. The charge pump is composed of capacitors CP1 to CPn and transistors Tr1 to Trn. The charge pump boosts the output CMout by inputting clock signals CLK and CLKB having opposite phases to each other to adjacent capacitors.

Figure 4:
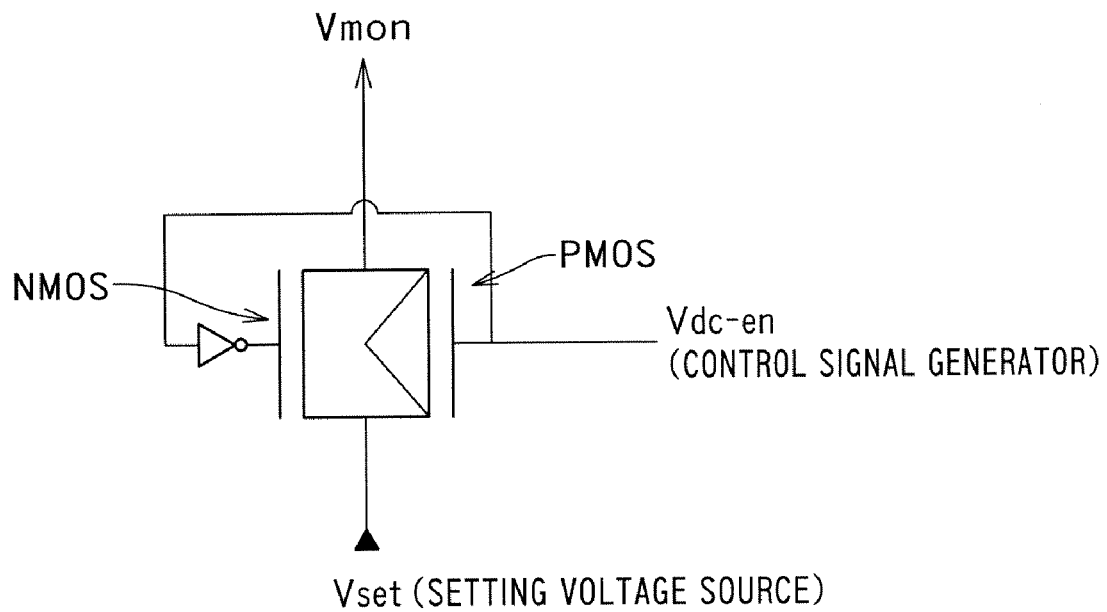
FIG. 4 is a circuit diagram of the switch SW according to the first embodiment.

FIG. 4 is a circuit diagram of the switch SW according to the present embodiment. In the present embodiment, the switch SW is composed of an NMIS transistor and a PMIS transistor that are connected in parallel to each other. The NMIS transistor and the PMIS transistor are integrally formed, thereby acting as a single switch.

The control signal Vdc-en from the control signal generator is inversely input to the gate of either one of the NMIS transistor or the PMIS transistor, and is non-inversely input to the gate of the other one of the transistors. For example, the control signal Vdc-en is inversely input to the gate of the NMIS transistor, and is non-inversely input to the gate of the PMIS transistor in the embodiment. Consequently, when the control signal Vdc-en is LOW, both of the NMIS transistor and the PMIS transistor become the ON state. When the control signal Vdc-en is HIGH, both of NMIS transistor and the PMIS transistor become the OFF state. Thus, the switch SW performs the switching operation.

Figure 5:
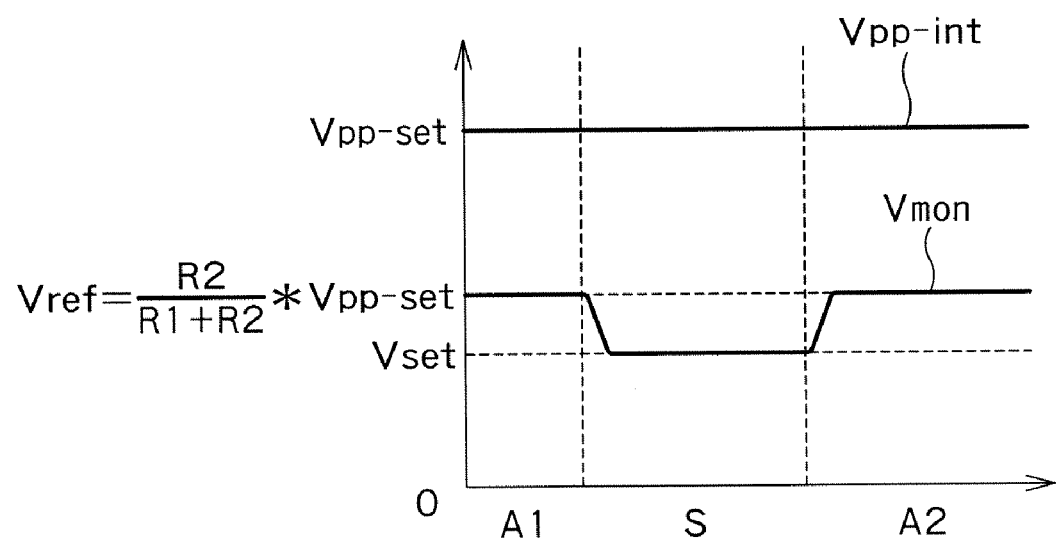
FIG. 5 is a graph of the internal power voltage Vpp-int and the monitor voltage Vmon when the VC circuit 100 transits between an active state and an inactive state.

FIG. 5 is a graph of the internal power voltage Vpp-int and the monitor voltage Vmon when the VC circuit 100 transits between an active state and an inactive state (a standby state). An operation of the VC circuit 100 is explained referring to FIG. 5. Vpp-set represents the internal power voltage Vpp-int that is set based on the reference voltage Vref. If the reference voltage Vref is a constant voltage, constant Vpp-set is output as the internal power voltage Vpp-int.

First, an operation when the VC circuit 100 is in the active state (A1 in FIG. 5) is explained. When the VC circuit 100 is in the active state, the voltage Vdc-en of the control signal generator is high. Accordingly, the transistors N10 to N30 are in the ON state, and the transistor P10 and the switch SW are in the OFF state.

Since the transistors N10 to N30 are in the ON state, the output terminal is connected to the ground GND through the resistors R10 and R20. Therefore, the voltage at the node N1 is a voltage obtained by dividing the internal power voltage Vpp-int at the output terminal by the resistors R10 and R20. Specifically, the voltage at the node N1 is (R20/(R10+R20))*Vpp-int.

Since the switch SW is in the OFF state, the setting voltage source is disconnected from the second input unit of the comparator AMP. Therefore, in the active state, the voltage at the node N1 is fed back as the monitor voltage Vmon. Specifically, the monitor voltage Vmon is (R20/(R10+R20))*Vpp-int. Thus, the internal power voltage Vpp-int can be monitored with the monitor voltage Vmon through the node N1.

Since the transistor N30 is in the ON state, the comparator AMP is in an active state. To the first input unit of the comparator AMP, the constant voltage Vref is supplied. To the second input unit, (R20/(R10+R20))*Vpp-int is input as the monitor voltage Vmon. The comparator AMP compares the reference voltage Vref and the monitor voltage Vmon, and amplifies a difference therebetween to output.

Since the transistor P10 is in the OFF state, the boosting circuit 10 is disconnected from the external voltage source. Therefore, the output of the comparator AMP is supplied to the boosting circuit 10 as CMout. When the reference voltage Vref and the monitor voltage Vmon become equal, the comparator AMP outputs LOW. Accordingly, a NOR gate G10 repeatedly outputs HIGH and LOW according to the clock signal CLK. The boosting circuit 10 boosts the external voltage Vcc based on the clock signal CLK. That is, the output of the comparator AMP acts as an enable signal to allow passage of the clock signal CLK at the NOR gate G10.

The internal power voltage Vpp-int is divided by the resistors R10 and R20 to be fed back to the comparator AMP. Therefore, the comparator AMP operates to equalize the constant voltage Vref and the monitor voltage Vmon. When the constant voltage Vref and the monitor voltage Vmon become equal, that is, when Vref=Vmon=(R20/(R10+R20))*Vpp-int, the VC circuit 100 becomes the steady state. The voltage Vpp-int at the output terminal in this steady state is to be the constant voltage Vpp-set. At this time, it is Vref=Vmon=(R20/(R10+R20))*Vpp-set.

Next, an operation when the VC circuit 100 is in the inactive state (S in FIG. 5) is explained. When the VC circuit 100 is in the inactive state, the voltage Vdc-en of the control signal generator is low. Accordingly, the transistors N10 to N30 are in the OFF state, and the transistor P10 and the switch SW are in the ON state.

Since the transistor N10 is in the OFF state, the node N1 is disconnected from the output terminal. Furthermore, since the transistor N20 is in the OFF state, the node N1 is also disconnected from the ground GND. Therefore, the node N1 becomes floating.

On the other hand, since the switch SW is in the ON state, the setting voltage source is connected to the second input unit of the comparator AMP. Consequently, the setting voltage Vset is input to the second input unit as the monitor voltage Vmon. The setting voltage Vset can be set to any voltage, however, in the present embodiment, the setting voltage Vset is set to a voltage higher than the voltage of the ground GND and lower than the constant voltage Vref.

Since the transistor N30 is in the OFF state, the comparator AMP becomes the inactive state. Since the transistor P10 is in the ON state, the external voltage source is connected to the boosting circuit 10. Therefore, the boosting circuit 10 is dependent on the external voltage source, not on the output from the comparator AMP. In the present embodiment, the external voltage Vcc is a voltage of high level. Accordingly, the voltage CMout is maintained at high level, and the NOR gate G10 shown in FIG. 3 outputs LOW irrespective of the clock signal CLK. Therefore, the boosting circuit 10 does not perform the boosting operation. That is, the external voltage Vcc acts as a disable signal not to allow passage of the clock signal CLK at the NOR gate G10.

As a result of the transistor P10 being in the OFF state, the voltage Vpp-int of the output terminal becomes dependent on the output of the voltage converting circuit VCs shown in FIG. 1. In the present embodiment, the output of the voltage converting circuit VCs is Vpp-set. Therefore, when the VC circuit 100 is in the inactive state, the Vpp-int remains as Vpp-set. At this time, the internal power voltage Vpp-int does not fluctuate. This is because the voltage converting circuit VCa is in the inactive state and the internal power voltage Vpp-int depends on the voltage converting circuit VCs.

When the VC circuit 100 is in the inactive state, the boosting circuit 10 is not operating. Since the threshold voltage of the transistor N10 is low, current can leak through the transistor N10 to lower the internal power voltage Vpp-int. To deal with this problem, the setting voltage Vset is set high. The setting voltage Vset is applied to the transistor N10 as a back bias voltage through the switch SW, the node N1, and the resistor R10 when the VC circuit 100 is in the inactive state. Therefore, by increasing the setting voltage Vset, the threshold voltage of the transistor N10 becomes high and leakage current decreases. As a result, decrease of the internal power voltage Vpp-int can be suppressed in the inactive state of the VC circuit 100. However, if the setting voltage Vset is too high, recovery response of the internal power voltage Vpp-int at the time when the VC circuit 100 transits from the inactive state to the active state becomes slow. Therefore, the setting voltage Vset is preferable to be set to the same value as the reference voltage Vref or to a value higher than that in some degree. If the leakage current can be suppressed to be sufficiently low amount, the setting voltage Vset can be lower than the reference voltage Vref, of course.

Next, an operation when the VC circuit 100 recovers again to the active state (A2 in FIG. 5) is explained. The voltage Vdc-en of the control signal generator becomes high. The transistors N10 to N30 become the ON state, and the transistor P10 and the switch SW become the OFF state. Accordingly, the comparator AMP is activated. As a result, the monitor voltage Vmon recovers from the setting voltage Vset to the constant voltage Vref.

According to the present embodiment, it is possible to make the difference between the setting voltage Vset and the constant voltage Vref small. Therefore, the monitor voltage Vmon recovers from the setting voltage Vset to the constant voltage Vref in a short time. Thus, the internal power voltage Vpp-int can be maintained in the steady state without deviating from the Vpp-set. That is, the transition response time when the VC circuit 100 transits from the inactive state to the active state is short.

In the present embodiment, the setting voltage Vset is a voltage higher than the ground GND and lower than the constant voltage Vref. However, the setting voltage Vset is preferable to be equal to the constant voltage Vref, thereby maintaining the monitor voltage Vmon at the constant voltage Vref in both cases where the VC circuit 100 is in the active state and in the inactive state. Thus, when the VC circuit 100 transits from the inactive state to the active state, the monitor voltage Vmon does not fluctuate and the recovery response of the VC circuit 100 is further improved. When the monitor voltage Vmon is equal to the constant voltage Vref, signals at the same potential are input to the first input unit and the second input unit of the comparator AMP. Generally, this can cause a malfunction such as divergence in the comparator AMP when the VC circuit 100 is in the inactive state. However, according to the present embodiment, when the VC circuit 100 is in the inactive state, the comparator AMP is disconnected from the external voltage source by the transistor N20. Therefore, even if the monitor voltage Vmon is equal to the constant voltage Vref, a malfunction is not caused in the comparator AMP.

According to the present embodiment, the setting voltage Vset is applied to the transistor N10 as a back bias voltage when the VC circuit 100 is in the inactive state. Therefore, by setting the setting voltage Vset high, the threshold voltage of the transistor N10 becomes high to reduce the leakage current. As a result, it is possible to suppress decrease of the internal power voltage Vpp-int when the VC circuit 100 is in the inactive state.

Second Embodiment

Figure 6:
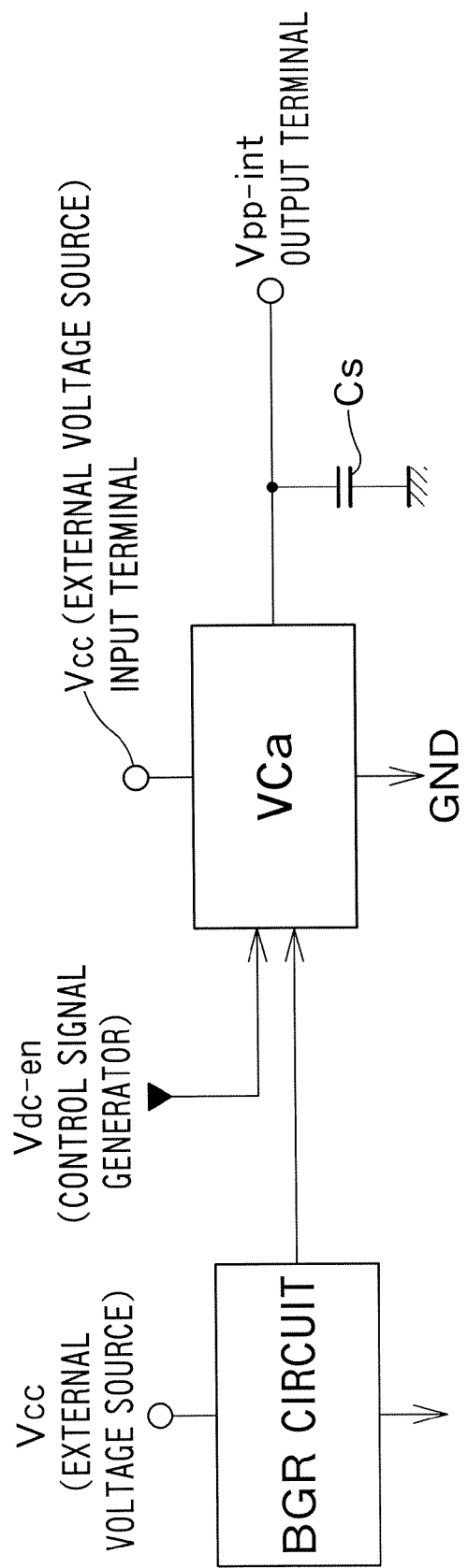
FIG. 6 is a block diagram of a power boosting circuit according to a second embodiment of the present invention.

FIG. 6 is a block diagram of a power boosting circuit according to a second embodiment of the present invention. The power boosting circuit according to the second embodiment does not include the voltage converting circuit VCs shown in FIG. 1, and instead of the voltage converting circuit VCs, the power boosting circuit includes a capacitor Cs between the output terminal and the ground. Other components of the power boosting circuit according to the second embodiment can be configured similarly to the power boosting circuit according to the first embodiment.

The capacitor Cs is provided to maintain and stabilize the internal power voltage Vpp-int in the standby state of the voltage converting circuit VCa. Therefore, when the capacitor Cs is provided, the voltage converting circuit VCs is not necessary. However, even when the voltage converting circuit VCs is provided, it is desirable to provide the capacitor Cs to stabilize the internal power voltage Vpp-int (see FIG. 1).

The voltage converting circuit VCa has the same configuration as the configuration shown in FIG. 2, and operations of the monitor voltage Vmon and the internal power voltage Vpp-int are the same as that shown in FIG. 5.

According to the second embodiment, the capacitor Cs is provided instead of the voltage converting circuit VCs. Therefore, the size of the entire device can be decreased. Furthermore, the second embodiment has the same effects as the first embodiment.

Figure 7:
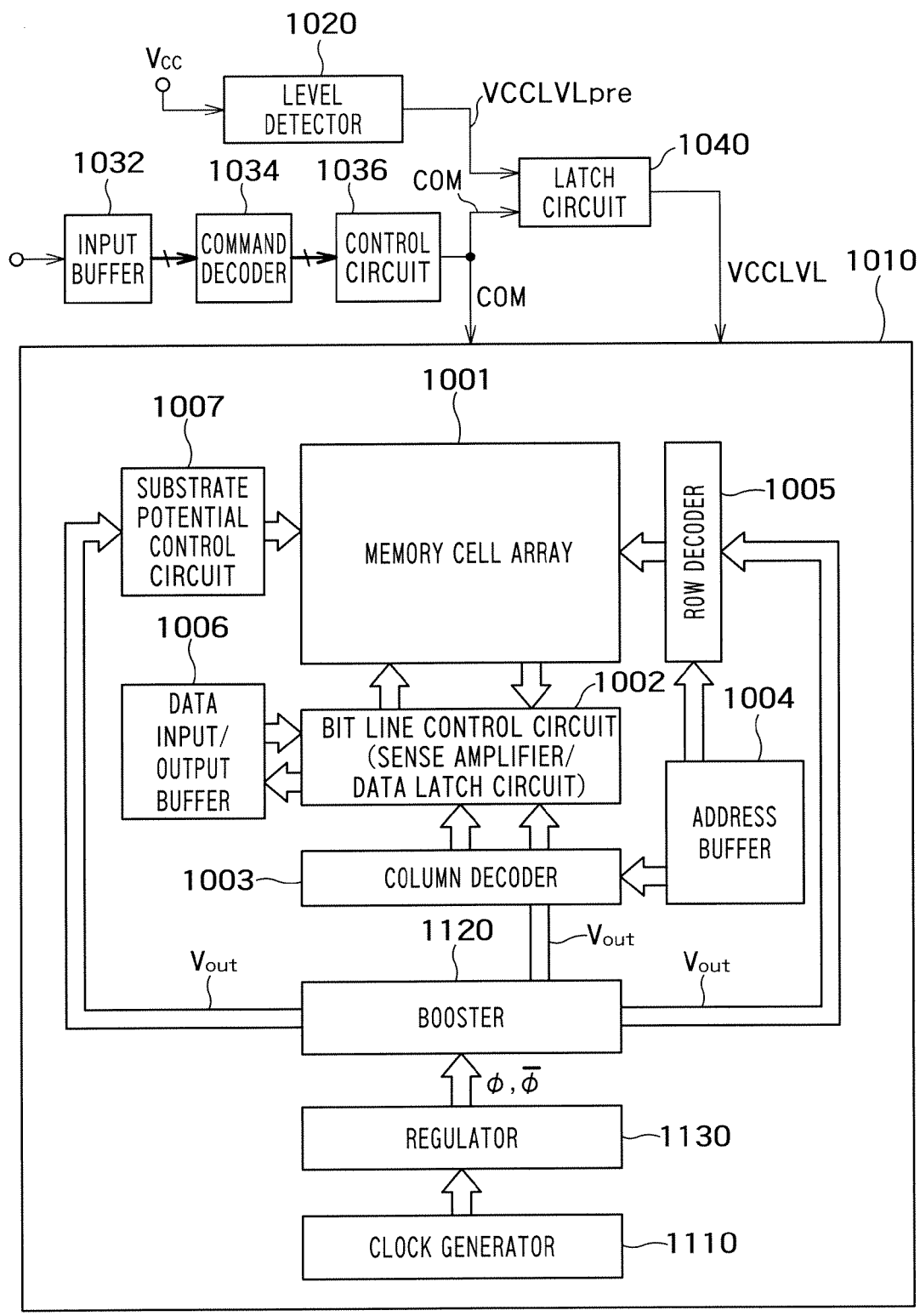
FIG. 7 is a block diagram of a semiconductor memory device 100 including the power supply circuit according to the first or the second embodiment of the present invention.

FIG. 7 is a block diagram of a semiconductor memory device 1000 including the power supply circuit according to the first or the second embodiment of the present invention. The semiconductor memory device 1000 is a non-volatile memory device corresponding with a dual range power supply voltage or a wide range power supply voltage, and is, for example, a NAND-type EEPROM, a NAND-type flash memory.

The semiconductor memory device 1000 comprises a memory unit and peripheral circuits thereof 1010. A bit line control circuit 1002 is provided at the memory unit and the peripheral circuits thereof 1010. The bit line control circuit 1002 carries out writing and reading of data to and from a memory cell array 1001. The bit line control circuit 1002 is connected to a data input/output buffer 1006. The bit line control circuit 1002 receives, as input, output of a column decoder 1003 that receives address signals from an address buffer 1004. For the memory cell array 1001, a row decoder 1005 and a substrate potential control circuit 1007 are provided. The row decoder 1005 controls a control gate and a select gate. The substrate potential control circuit 1007 controls potential of a p-type substrate (or a p-type well) on which the memory cell array 1001 is formed, is provided.

The semiconductor memory device 1000 has a clock generator 1110, a regulator 1130, and a booster 1120. The booster 1120 may be the power supply circuit according to the first or the second embodiment. The booster 1120 supplies various boosted voltages to the bit line control circuit 1002, the row decoder 1005, and the substrate potential control circuit 1007. The boosted voltages are needed for operation at times of reading/writing/deleting data with respect to the memory cell array 1001. The booster 1120 can supply boosted voltage that is stabilized by the regulator 1130.

I claim:
1. A power supply circuit comprising:
    a voltage converter receiving an external voltage from an external voltage source and outputting an internal voltage which is different from the external voltage;
    a first switching element and a second switching element connected between an output of the voltage converter and a constant voltage source;
    a resistor provided between the first switching element and the second switching element, and dividing the internal voltage;
    a comparator including a first input unit, a second input unit, and an output unit which is connected to the voltage converter;
    a reference voltage source supplying a reference voltage to the first input unit;
    a feedback unit feeding back a voltage divided by the resistor to the second input unit from a node between the first switching element and the second switching element;
    a setting voltage source supplying a voltage which is arbitrarily set, to the second input unit;
    a third switching element connected between the setting voltage source and the second input unit; and
    a control signal generator controlling the first switching element, the second switching element, and the third switching element, wherein
    when the voltage converter is controlled by the comparator, the control signal generator controls the first switching element and the second switching element to be in an ON state and controls the third switching element to be in an OFF state, and
    when the voltage converter is controlled by the external voltage source, the control signal generator controls the first switching element and the second switching element to be in the OFF state and controls the third switching element to be in the ON state.

2. A power supply circuit comprising:
a voltage converter receiving an external voltage from an external voltage source and outputting an internal voltage which is different from the external voltage;
a first switching element and a second switching element connected between an output of the voltage converter and a constant voltage source;
a resistor provided between the first switching element and the second switching element, and dividing the internal voltage;
a comparator including a first input unit, a second input unit, and an output unit which is connected to the voltage converter;
a reference voltage source supplying a reference voltage to the first input unit;
a feedback unit feeding back a voltage divided by the resistor to the second input unit from a node between the first switching element and the second switching element;
a setting voltage source supplying a voltage which is arbitrarily set, to the second input unit;
a third switching element connected between the setting voltage source and the second input unit;
a control signal generator controlling the first switching element, the second switching element, and the third switching element;
a fourth switching element connected between the voltage converter and the external voltage source; and
a fifth switching element arranged on a power route through which power is supplied to the comparator from the external power source, wherein
the control signal generator further controls the fourth switching element and the fifth switching element,
when the voltage converter is controlled by the comparator, the control signal generator controls the first switching element, the second switching element, and the fifth switching element to be in an ON state and controls the third switching element and the fourth switching element to be in an OFF state, and
when the voltage converter is controlled by the external voltage source, the control signal generator controls the first switching element, the second switching element, and the fifth switching element to be in the OFF state and controls the third switching element and the fourth switching element to be in the ON state.

3. The power supply circuit according to claim 1, wherein the voltage of the setting voltage source is lower than the internal voltage and higher than the voltage of the constant voltage source.

4. The power supply circuit according to claim 1, wherein the voltage of the setting voltage source is substantially equal to the voltage of the reference voltage source.

5. The power supply circuit according to claim 1, wherein when the voltage converter is controlled by the external voltage source, the setting voltage source is connected to the output of the voltage converter through a part of the resistor and the first switching element.

6. The power supply circuit according to claim 1, further comprising a capacitor connected between the output of the voltage converter and the setting voltage source.

7. A method of driving a power supply circuit that includes a voltage converter receiving an external voltage from an external voltage source and outputting an internal voltage that is different from the external voltage, a first switching element and a second switching element which are connected between an output of the voltage converter and a constant voltage source, a resistor provided between the first switching element and the second switching element, a comparator including a first input unit, a second input unit, and an output unit which is connected to the voltage converter, a reference voltage source connected to the first input unit, a feedback unit feeding back a voltage divided by the resistor to the second input unit from a node which is present between the first switching element and the second switching element, a setting voltage source connected to the second input unit, and a third switching element connected between the setting voltage source and the second input unit, the method comprising:
turning the first switching element and the second switching element into an ON state, and the third switching element into an OFF state, when the voltage converter is performing a boosting operation; and
turning the first switching element and the second switching element into the OFF state, and the third switching element into the ON state, when the voltage converter is not performing the boosting operation, wherein
the power supply circuit further includes a fourth switching element connected between the voltage converter and the external voltage source, and a fifth switching element arranged on a power route through which power is supplied to the comparator from the external power source, and wherein
the method includes turning the first switching element, the second switching element, and the fifth switching element into the ON state, and the third switching element and the fourth switching element into the OFF state, when the voltage converter is performing the boosting operation, and
turning the first switching element, the second switching element, and the fifth switching element into the OFF state, and the third switching element and the fourth switching element into the ON state, when the voltage converter is not performing the boosting operation.

8. The method according to claim 7, wherein the voltage of the setting voltage source is lower than the internal voltage and higher than the voltage of the constant voltage source.

9. The method according to claim 7, wherein the voltage of the setting voltage source is substantially equal to the voltage of the reference voltage source.

10. The method according to claim 7, wherein when the voltage converter is not performing the boosting operation, the setting voltage source is connected to the output of the voltage converter through a part of the resistor and the first switching element.

* * * * *